(12) United States Patent
Wu

(10) Patent No.: US 6,666,613 B2
(45) Date of Patent: Dec. 23, 2003

(54) EASILY ASSEMBLED LAMP RETAINING DEVICE

(76) Inventor: Wen-Chang Wu, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 10/074,442

(22) Filed: Feb. 13, 2002

(65) Prior Publication Data

US 2003/0152423 A1 Aug. 14, 2003

(51) Int. Cl.[7] .............................. F16B 1/00; F21S 8/06
(52) U.S. Cl. ...................... 403/299; 403/294; 403/331; 403/199; 403/201; 362/405; 285/325; 285/139.1
(58) Field of Search ................................ 403/187, 188, 403/192, 199, 201, 292, 294, 299, 230, 331; 362/405; 285/325, 327, 103, 67, 139.1, FOR 143

(56) References Cited

U.S. PATENT DOCUMENTS

| | | | | |
|---|---|---|---|---|
| 1,587,330 A | * | 6/1926 | Kahns et al. | 248/342 |
| 2,265,268 A | * | 12/1941 | Culligan | 285/325 |
| 2,657,941 A | * | 11/1953 | Adzima | 280/301 |
| 3,387,129 A | * | 6/1968 | Weber et al. | 362/392 |
| 4,748,549 A | * | 5/1988 | Scheer | 362/406 |
| 5,167,478 A | * | 12/1992 | Ramunas | 409/234 |
| 5,475,578 A | * | 12/1995 | Sevack et al. | 362/405 |
| 5,788,291 A | * | 8/1998 | Williams et al. | 285/325 |
| 5,836,740 A | * | 11/1998 | Wang | 416/5 |
| 5,873,652 A | * | 2/1999 | Bayer et al. | 362/405 |
| 5,997,046 A | * | 12/1999 | Hoeptner, III | 285/27 |

* cited by examiner

Primary Examiner—Lynne H. Browne
Assistant Examiner—Jori Schiffman

(57) ABSTRACT

A lamp rod comprises a retaining seat and an inserting rod. A wire connecting box has a via hole at a periphery thereof. A lateral side of the retaining seat extends with an inserting portion exactly passing through the via hole of the wire connecting box. A positioning ring is positioned at an interior of the wire connecting box for locking the inserting portion. One end of the retaining seat far away from the wire connecting box has two sliding grooves. One end of the inserting rod coupled to the retaining seat is installed with an inserting seat. Two sides of the inserting seat have stepped guide blocks. The guide blocks are exactly engaged with the two sliding grooves of the retaining seat. Thereby, in transfer and storage, the inserting rod can be pulled out from the wire connecting box so as to occupy a smaller space.

1 Claim, 3 Drawing Sheets

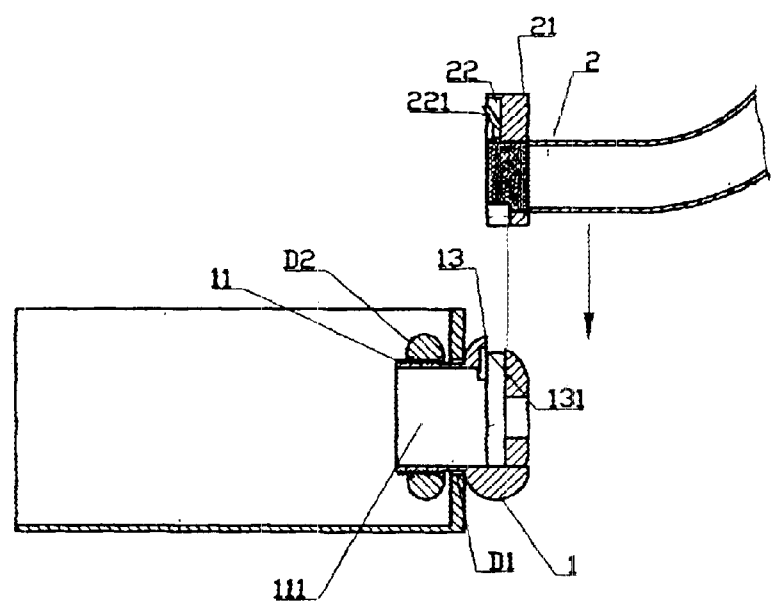
FIG3-A
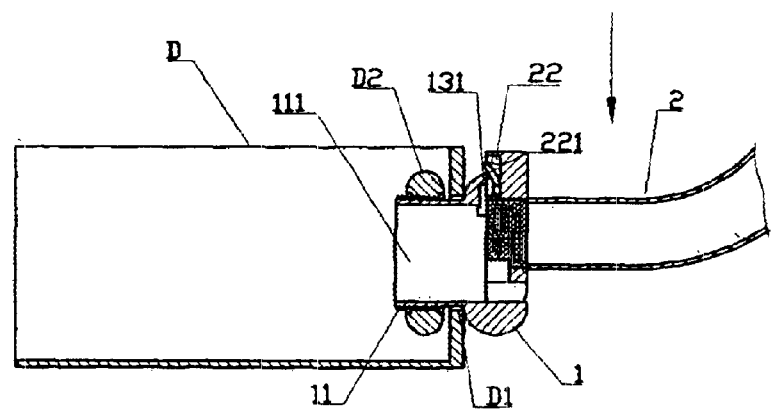
FIG3-B
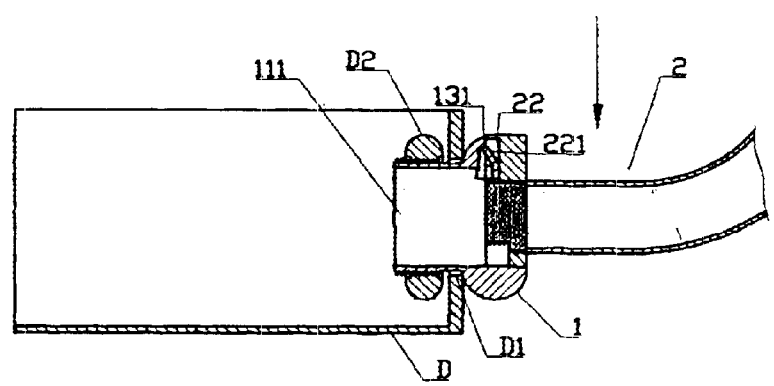
FIG3-C

EASILY ASSEMBLED LAMP RETAINING DEVICE

FIELD OF THE INVENTION

The present invention relates to lamps, and particularly to an easily assembled lamp retaining device, wherein the inserting rod can be pulled out from a wire connecting box for transfer and storage by only using a smaller space. Furthermore, the user can assemble the inserting rod by just inserting the inserting rod into the wire connecting box.

BACKGROUND OF THE INVENTION

Prior wire connection devices of lamps, such as wall lamps, stand type lamps, and ceiling lamps, use studs and nuts to lock the components. In assembly, not only the user is easy to be harmed, but also other locking tools (such as spanners, openers, etc.) are necessary. Moreover, in assembly, electric wires are easy to expose out and some dangers are induced. Thereby, the prior art is not suitable to be assembled by the user himself (or herself). In general, since in the prior art design, the wire is possibly exposed out if the assembly work is performed by the user, the manufacturer assembles the device in advance, namely, the wire box is assembled with inserting rods in the manufacturing process. However, this will induce that a large space is required for transferring and storing and thus cost is increased.

SUMMARY OF THE INVENTION

Accordingly, the primary object of the present invention is to provide an easily assembled lamp retaining device comprising a retaining seat at a lateral side of a wire connecting box, and an inserting rod inserted into the retaining seat. The wire connecting box has a via hole at a periphery thereof. A lateral side of the retaining seat extends with an inserting portion exactly passing through the via hole of the wire connecting box. A positioning ring is positioned at an interior of the wire connecting box for locking a portion of the inserting portion. One end of the retaining seat far away from the wire connecting box has two sliding grooves. One end of the inserting rod coupled to the retaining seat is installed with an inserting seat. Two sides of the inserting seat have stepped guide blocks. The guide blocks are exactly engaged with the two sliding grooves of the retaining seat. Thereby, the inserting rod can be pulled out from the wire connecting box for transferring and storage with a smaller space.

Another object of the present invention is to provide an easily assembled lamp retaining device, wherein a limiting ring is released, then the inserting rod can be pulled out. Thus it can be packaged and stored, the wire connecting box and inserting rod can be detached so as to reduce the volume for storing, transferring and packaging. Since the wire connecting box and inserting rod can be detached for reducing the space in transferring and storing, and the retaining seat inserted by the inserting rod is installed to the wire connecting box in advance. Thereby, the user need only insert the inserting rod into the wire connecting box and then lock the limiting ring and thus the assembly of the present invention is completed. No other stud, or tool is necessary in the assembly process.

The various objects and advantages of the present invention will be more readily understood from the following detailed description when read in conjunction with the appended drawing.

BRIEF DESCRIPTION OF THE DRAWINGS

FIG. 1-A is an alternate view of the retaining seat of FIG. 1.

FIG. 3 is a plane schematic view of the wire connecting box D of the present invention.

FIG. 3-A is a plane cross sectional view of the present invention before the inserting rod is inserted.

FIG. 3-B is a plane cross sectional view of the present invention where the inserting rod is being inserted.

FIG. 3-C is a plane cross sectional view of the present invention after the inserting rod is inserted.

DETAILED DESCRIPTION OF THE PREFERRED EMBODIMENTS

Figure 1:
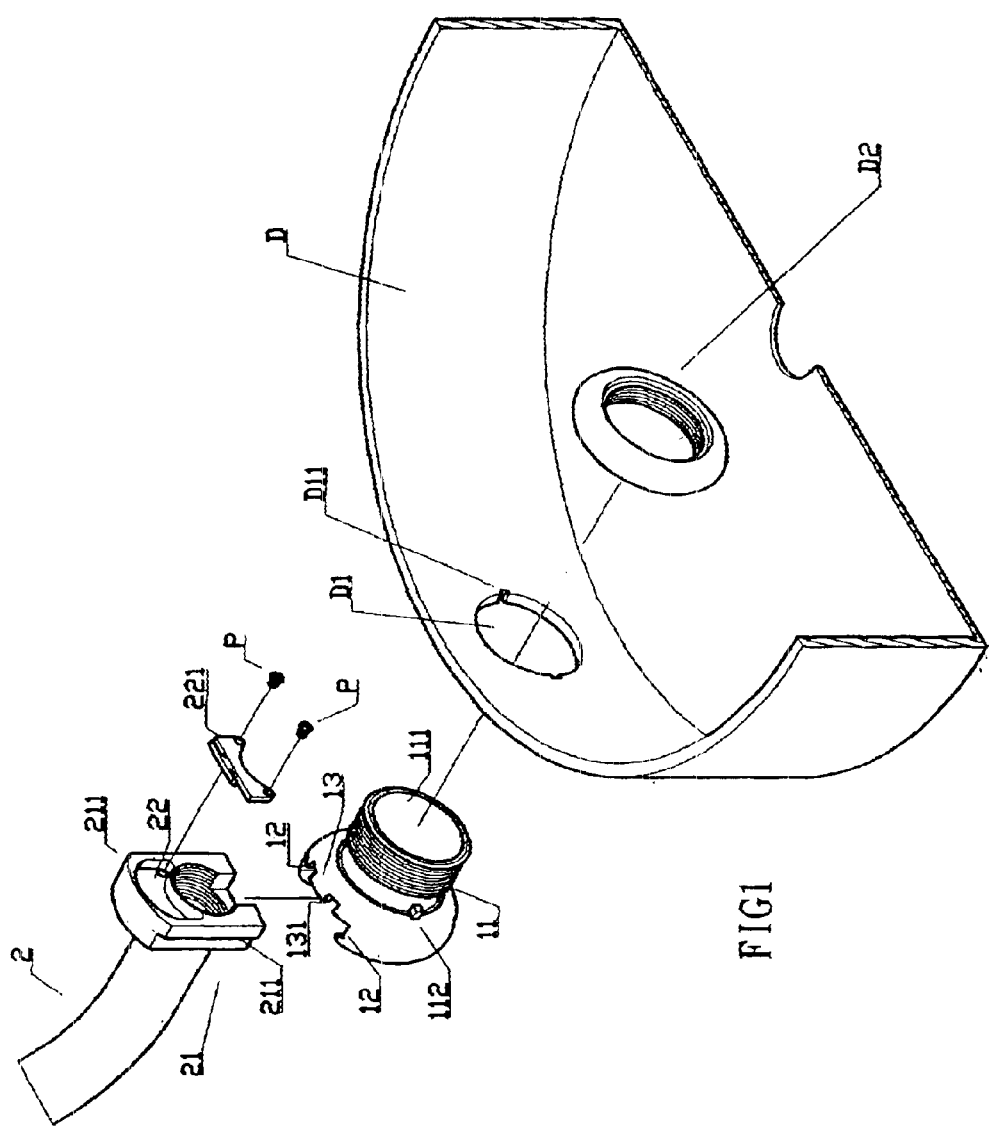
FIG. 1 is an exploded perspective view of the present invention.
Figure 1A:
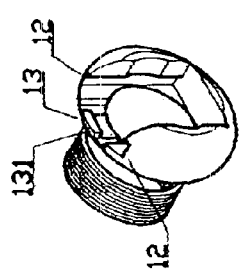
Figure 2:
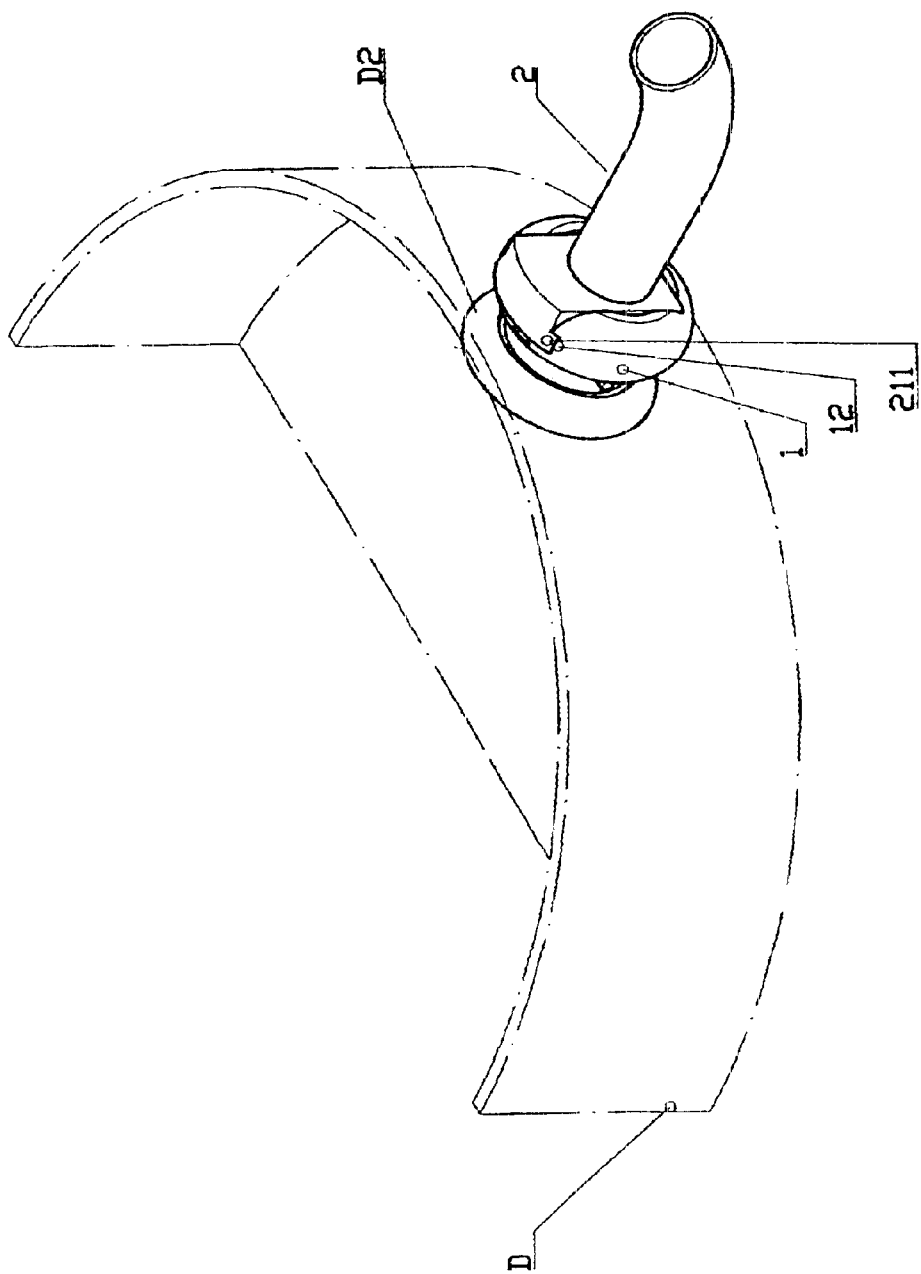
FIG. 2 is an assembled view of the present invention.

With reference to FIGS. 1 and 3, the structure of the easily assembled lamp retaining device according to the present invention is clearly illustrated. The present invention is formed by a retaining seat 1 at a lateral side of a wire connecting box D, and an inserting rod 2 inserting into the retaining seat 1.

The wire connecting box D has a via hole D1 at a periphery thereof, and each of two sides of the via hole D1 has a respective buckling groove D11.

A lateral side of the retaining seat 1 extends with an inserting portion 11 exactly passing through the via hole D1 of the wire connecting box D. The interior of the inserting portion 11 has a through hole 111. Two sides of the inserting portion 11 corresponding to at two sides of the via hole D1 have buckling protrusions 112 for positioning the retaining seat 1. A positioning ring D2 at an interior of the wire connecting box D serves to lock the inserting portion 11. Thereby, the retaining seat 1 is positioned at an outer side of the wire connecting box D. One end of the retaining seat 1 far away from the wire connecting box D has two sliding grooves 12. A buckling block 13 is positioned between the two sliding grooves 12. An outer edge of the buckling block 13 is extended with a buckling edge 131 for confining an elastomer 221 of the inserting rod 2.

One end of the inserting rod 2 coupled to the retaining seat 1 is installed with an inserting seat 21. Two sides of the inserting seat 21 have stepped guide blocks 211. The guide blocks 211 are exactly engaged with the two sliding grooves 12 of the retaining seat 1. One end of the inserting seat 21 engaging to the buckling block 13 is formed with a receiving groove 22. The receiving groove 22 is locked to the elastomer 221 through a stud P. The elastomer 221 is inclined upwards from a locking end.

Referring to FIGS. 3, 3A, 3B, and 3C, one embodiment of the present invention is illustrated, after inserting the guide blocks 211 of the inserting rod 2 into the sliding grooves 12 of the retaining seat 1; as the elastomer 221 of the inserting rod 2 is resisted by the buckling block 13 of the retaining seat 1., the buckling edge 131 of the buckling block 13 can press the outward inclined elastomer 221. After the buckling edge 131 passes through the elastomer 221, by the resilient force of the elastomer 221, the elastomer 221 is buckled by the buckling edge 131 and thus is confined. As a result, the inserting rod 2 is retained in the interior of the retaining seat 1.

Two sides of the via hole of the wire connecting box have buckling groove D11, and two sides of the inserting portion corresponding to at two sides of the via hole have buckling protrusions for positioning the retaining seat.

The present invention is thus described, it will be obvious that the same may be varied in many ways. Such variations are not to be regarded as a departure from the spirit and scope of the present invention, and all such modifications as would be obvious to one skilled in the art are intended to he included within the scope of the following claims.

What is claimed is:

1. A lamp rod of an easily assembled lamp retaining device comprising:

a wire connecting box having a via hole at a periphery thereof; two buckling grooves being at two sides of the via hole of the wire connecting box;

a retaining seat at a lateral side of a wire connecting box, comprising:

an inserting portion extending from a lateral side of the retaining seat; the inserting portion exactly passing through the via hole of the wire connecting box; the inserting portion having a through hole at an interior thereof; one end of the retaining seat far away from the wire connecting box having two sliding grooves; a buckling block being positioned between the two sliding grooves; the two sides of the inserting portion corresponding to the two sides of the via hole having buckling protrusions for positioning the retaining seat;

an inserting rod inserted into the retaining seat; comprising:

an inserting seat installed at one end of the inserting rod coupled to the retaining seat; two sides of the inserting seat having stepped guide blocks; the guide blocks being exactly engaged with the two sliding grooves of the retaining seat; one end of the inserting seat engaging to the buckling block being formed with a receiving groove;

a positioning ring being positioned at an interior of the wire connecting box for locking a portion of the inserting portion inserted into the wire connecting box;

wherein the receiving groove of the inserting seat being locked with an elastomer through a stud; the elastomer being inclined upwards from a locking end, thereby, the buckling edge of the retaining seat will press the elastomer;

thereby, the inserting rod can be pulled out from the wire connecting box and thus as in transferring and storage, they are arranged with a smaller space.

* * * * *